United States Patent

[11] 3,546,392

[72] Inventor Eberhard Herter
Stuttgart, Germany
[21] Appl. No. 632,312
[22] Filed April 20, 1967
Continuation-in-part of Ser. No. 555,913, June 7, 1966, Pat. No. 3,525,816
[45] Patented Dec. 8, 1970
[73] Assignee International Standard Electric Corporation
New York, N.Y.
a corporation of Delaware
[32] Priority April 23, 1966
[33] Germany
[31] St 25,275

[54] COORDINATE MATRIX ARRANGEMENT FOR SUPERVISION OF LOOP CONDITIONS AND FOR DISCERNING LOOP RESISTANCES IN A PLURALITY OF LOOPS
6 Claims, 5 Drawing Figs.

[52] U.S. Cl. .......... 179/18
[51] Int. Cl. .......... H04m 3/22
[50] Field of Search .......... 179/18.3(A), 18(BT), 18.7(YA), 18.6(A)

[56] References Cited
UNITED STATES PATENTS

| | | | |
|---|---|---|---|
| 3,035,122 | 5/1962 | Livingstone .......... | 179/18(.3A) |
| 3,249,699 | 5/1966 | Mol et al .......... | 179/18(BT) |

FOREIGN PATENTS

| | | | |
|---|---|---|---|
| 1,112,755 | 8/1961 | Germany .......... | 179/18(.3A) |

*Primary Examiner*—Kathleen H. Claffy
*Assistant Examiner*—Thomas W. Brown
*Attorneys*—C. Cornell Remsen, Jr., Rayson P. Morris, Percy P. Lantzy, J. Warren Whitesel and Phillip A. Weiss and Delbert P. Warner

ABSTRACT: A group supervision circuit in which six-pole bridge-type circuits are combined in a multidimensional matrix of columns and rows. A line is coupled to each of the bridge-type circuits making up the matrix. The desired line is tested in the arrangement on a time multiplex basis by operating the particular bridge-type circuit that is coupled to the line. The arrangement is advantageous because even though the time multiplex signal is applied for an arbitrary time, nonetheless transients are negligible.

COORDINATE MATRIX ARRANGEMENT FOR SUPERVISION OF LOOP CONDITIONS AND FOR DISCERNING LOOP RESISTANCES IN A PLURALITY OF LOOPS

This is a continuation-in-part of the previously filed application entitled CIRCUIT ARRANGEMENT FOR LOOP SUPERVISION AND FOR DISCERNING LOOP RESISTANCES which was filed on June 7, 1966, has Ser. No. 555,913 now U.S. Pat. No. 3,525,816, and is assigned to the assignee of this application.

This invention is concerned with circuit arrangements for supervising loop conditions and for discerning loop resistances and more particularly is concerned with matrix arrangements of bridge-type circuits for supervising a plurality of loops utilizing common supervisory control equipment.

The first-filed patent application describes circuit arrangements for supervising loop conditions and for discerning loop resistances, particularly for DC signals in a DC-fed telecommunication or telephone line. The arrangements comprise evaluating devices connected via one or several auxiliary voltage sources having summed voltages opposed to the feeder voltage. The auxiliary voltages are selected in such a way that, at the desired threshold value of the loop resistance, a circuit arrangement at the terminals of the evaluating device is balanced. The auxiliary voltages are reduced in the circuit arrangement by means of two voltage dividers, each formed by the resistors R1 and R2 of which one voltage divider is connected to the positive terminal with the first resistor and the other voltage divider is connected to the negative terminal with the first resistor.

The present invention relates to advantageous embodiments of the circuit arrangements according to the first-filed application wherein a plurality of supervising facilities, described in the first-filed patent application are combined in one circuit arrangement and this combination is actuated with a central facility for one interrogation.

In the evaluating circuits known using magnetic cores, the magnetic cores are connected to each line with the feeder circuit. A reading loop is led through all cores. If an interrogating pulse is applied to one of the circuits the answer in the reading loop indicates in which condition the respective line is at the time of interrogation.

Moreover, it is known of core-type storages to use the individual core also for a logical intermeshing, required for operation. To this end, instead of requiring one interrogation winding, operated with an interrogating pulse of the magnitude 1, $n$ interrogating windings per core are necessary, whereby the pulse for each winding has the magnitude $\frac{1}{n}$. The circuits are arranged to a $n$-dimension matrix and each core can be individually operated through its $n$ coordinates, at a suitable combination of the interrogating windings.

The disadvantage in this arrangement is that the signal, identifying the condition of the supervised line is a short pulse only, depending on the voltage-time integral of the magnetic core.

The advantage of the device according to the invention is that the output signal is applied to the evaluating device for a time that can be selected arbitrarily.

The circuit arrangement for supervising the loop condition according to the invention is characterized in this that at least one of the voltage dividers is always connected with its second resistance to a potential which blocks the evaluating device for any specified output resistance. In addition, at least one of the voltage dividers is connected with its second resistance to a potential which renders the evaluating device effective; so that a DC voltage as well as an AC voltage can be used as a feeder voltage.

The invention is now described with the aid of the accompanying drawings.

Figure 1:
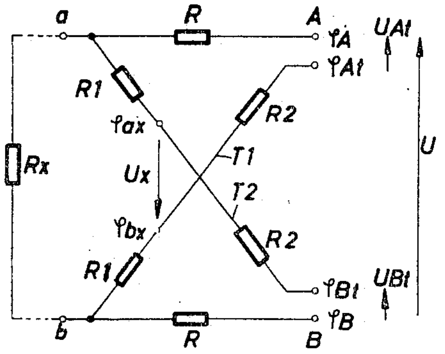
FIGS. 1 and 2 show a six-pole bridge in which both voltage dividers can be connected with their second resistor to different potentials (two coordinates).
Figure 2:
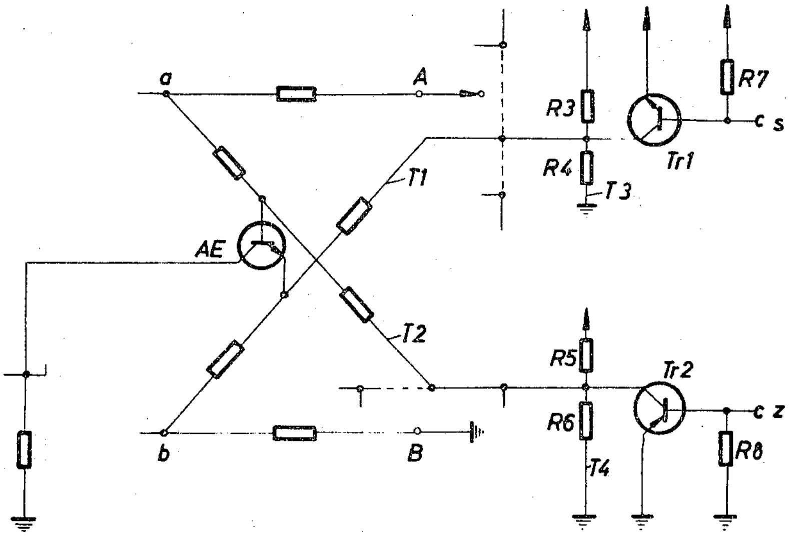

The six-pole bridge according to FIGS. 1 and 2 is connected to a line circuit having the terminals A and B connected to the feeder voltage U, at the terminals. The line loop is connected at the terminals *a* and *b*, with its variable resistance Rx. The terminals *a* and *b* are also connected to the two voltage dividers T1 and T2, respectively. The voltage dividers each comprise resistors R1 and R2, with the resistor R1 connected to the terminals *a* and *b*. Between the terminals A and *a*, B and *b* the feeder resistors R are connected.

The neuter branch of the bridge-type circuit forms the tappings of both voltage dividers with the potentials $\rho ax$ and $\rho bx$, to which the evaluating device AE is connected.

When using the six-pole bridge as an individual circuit the voltage dividers are connected with their second resistors to one terminal of the feeder voltage source. However this is not mandatory. The voltage dividers may also be connected to other voltages proportional to the feeder voltage. Particularly the magnitude of the voltages, applied to the voltage dividers at the resistors R2, can be selected so that, at an arbitrary loop resistance Rx, the voltage Ux which is equal to $\rho ax - \rho bx$ in the neuter branch of the bridge-type circuit is minimal, thereby assuring that the transistor of the evaluating device is blocked.

If the resistors R2 of a plurality of equal voltage dividers, e.g. a plurality of voltage dividers T1 or a plurality of voltage dividers T2, of several six-pole bridges are interconnected, the properties of these can be changed with regard to the voltage in the neuter branch in a defined way. The change is accomplished if the common point is connected selectively to different values of an auxiliary voltage UBt or UAt, respectively. The auxiliary voltage UBt is the voltage between the positive terminal of the feeder source and the voltage divider resistor R2 of the divider T2 and the auxiliary voltage UAt is the voltage between the resistor R2 of voltage divider T1 and the negative terminal of the feeder source.

These two auxiliary voltages are obtained, in the example, with the aid of two voltage dividers T3 and T4, respectively connected to the voltage source and having a ratio such that at their center tapping the potential $\rho At = UAt + \rho A$ or $\rho Bt = \rho B - UBt$ is applied. The voltage dividers T1 and T2 are connected to the center tappings. In the nonoperative condition the evaluating device AE is blocked.

The operative condition is established when the transistor Tr1 and the transistor Tr2 become conductive, whereby the resistor R3 of the voltage divider T3 and the resistor R6 of the voltage divider T4 are short circuited and the voltage dividers T1 and T2 are effectively connected directly to the feeder voltage with their resistors R2.

The evaluating device AE remains blocked in the circuit arrangement, shown in FIG. 2, if only one of the transistors Tr1 and Tr2 is actuated. This operation is recognized as similar to that described with regard to FIG. 7 of the originally-filed application.

This kind of operation is of particular advantage with regard to a time-multiple interrogation.

The selection of the amplitude of the voltages UAt and UBt depends on the values of the loop resistance Rx that can occur. The voltages UAt and UBt must be higher when the values of Rx are smaller. It is easy to understand that the mode of operation of the circuit arrangement does not depend on whether the feeder voltage and the auxiliary voltages, derived from said feeder voltage, are DC or AC voltages.

Figure 3:
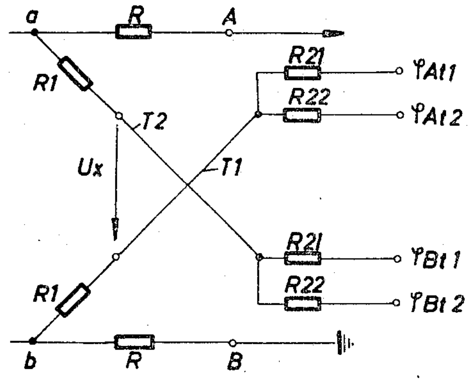
FIG. 3 shows the subdivision of the respective second resistors into a parallel circuit of two resistors for four coordinates, for example.

FIG. 3 shows a possibility of actuation in more than two coordinates, thereby one value of one of the auxiliary voltages must be sufficient to block the evaluating device, regardless of the value of the other auxiliary voltages and of the loop resistance Rx.

Figure 4:
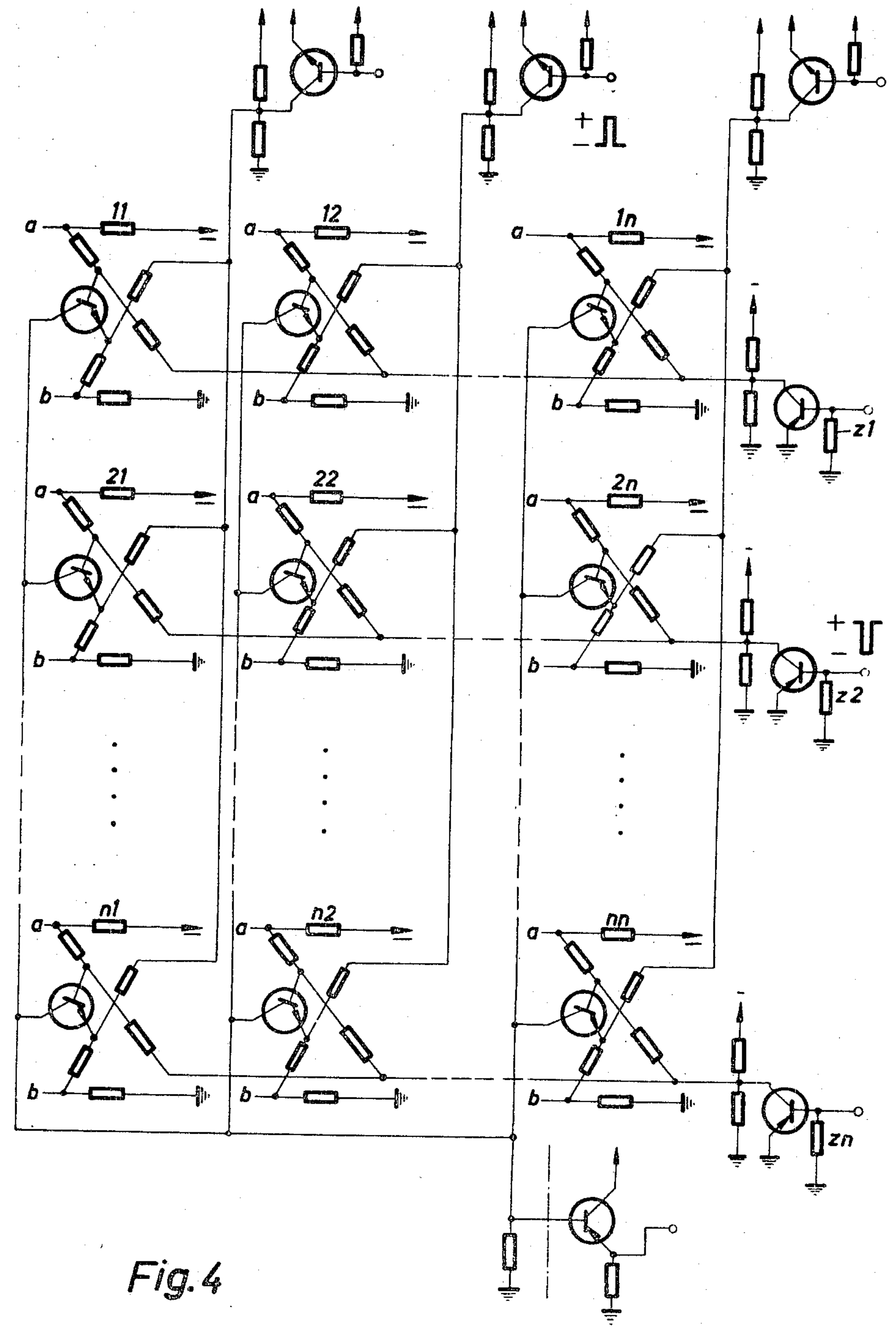
FIG. 4 shows the two-dimensional actuation of matrix-shaped six-pole bridges across lines and columns by switching over of the voltage dividers.

FIG. 4 shows an example of a coordinate or matrix-shaped circuit arrangement.

The voltage dividers T2 are connected with their resistors R2 coupled to first common busses in each row of the matrices. The first common busses form one coordinate. The second coordinate is formed by the corresponding connection of the voltage dividers T1 with their resistors R2 coupled to second common busses in each column. In FIG. 4 the operation of the six-pole bridge circuit 22 is shown as an example. Thus, transistors Tr1 and Tr2 are pulsed to conduct. This shorts resistor R3, R6 and causes evaluating device AE at circuit 22 to operate and determine the line condition of the line coupled to terminals a, b of circuit 22.

Since the resistors of the voltage dividers can be selected to be high-ohmic only a small current change results at all switching points.

The creation of arbitrary feeder circuits during the time multiple by fortuitously switching over the resistors and/or the feeder potential is impossible, because the loop current thereby receives another value. Consequently, an actuated circuit would furnish a reliable reply only after the loop's transient time, that is e.g. after 10 to 20 ms. However, the time used by one interrogating pulse switching the transistors Tr1, Tr2 in the above described description, is smaller than the 10 ms. by significant orders of magnitude. Also the switching over of the high-ohmic voltage divider in the six-pole bridge results in a negligible change of the loop current, considered by the described respective arrangement. The evaluating device of the actuated circuit is thus switched so as to be effective immediately.

Figure 5:
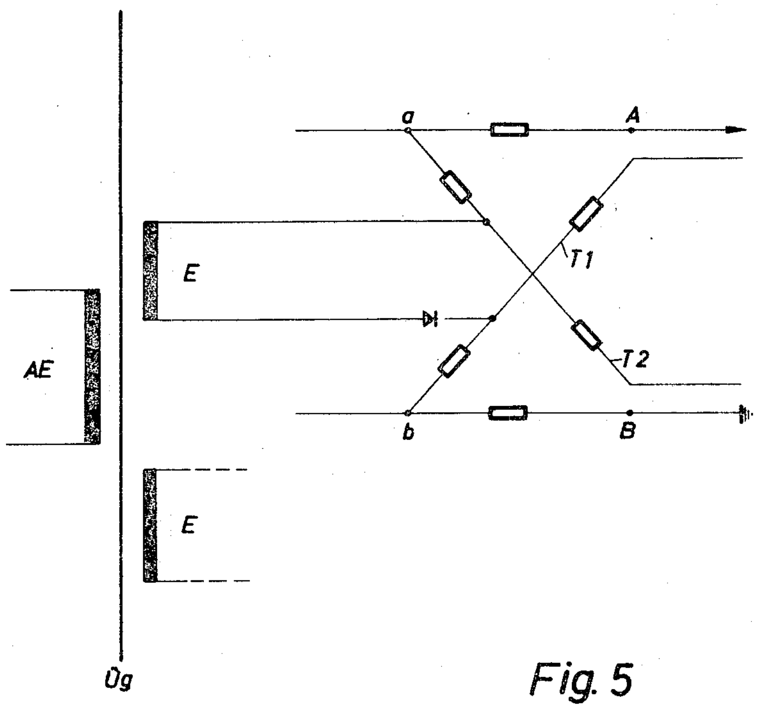
FIG. 5 shows another possibility of evaluation.

If it is desired to operate the bridge-type circuit at an AC frequency a minimum expenditure of one diode per individual circuit arrangement is needed as shown in FIG. 5. The diodes block in all not-actuated circuits. At the actuated circuit the diode blocks or is conductive, depending on the resistance of the line loop. The current pulse can be decoupled through a conductive diode by a repeater transformer Ug, common to all circuits, having for each circuit an input winding E.

While the above principles and advantages of the invention have been described in connection with specific arrangements and apparatus, it is to be clearly understood that this description is made only by way of example and not as a limitation on the scope of the invention.

I claim:

1. Loop supervision circuitry for supervising the loop conditions and for discerning loop resistances in a plurality of telephone lines, each of said lines comprising:
- a supply voltage source having a negative terminal and a positive terminal; and
- said loop supervision circuitry comprising:
  - a first feeder resistor at each of said lines connected from the negative terminal of said supply voltage source to one coupling terminal of each of said lines;
  - a second feeder resistor at each of said lines connected from the positive terminal of said voltage source to the other coupling terminal of each of said lines;
  - evaluating circuitry for evaluating the loop conditions at each of said lines;
  - said evaluating circuitry comprising a coordinate matrix of six terminal bridge-type circuits;
  - said matrix comprising a coordinate array of columns and rows of said bridge-type circuits;
  - means comprising said coupling terminals for coupling each of said bridge-type circuits to an individual one of said plurality of lines;
  - said coupling terminals comprising the first two of said six terminals;
  - said negative and positive terminals comprising the second two of said six terminals;
  - first and second voltage divider legs each extending respectively from one of said first two terminals, the terminals of said first and second voltage divider legs opposite said first two terminals comprising the third two of said six terminals;
  - row and column control means coupled to the third two of said six terminals for forming a plurality of said six terminal circuits into said matrix;
  - evaluating means coupled between points on said first and second voltage divider legs;
  - said supply voltage source means supplying voltage that is sufficient to block the said evaluating means for an arbitrary resistance of said line; and
  - means comprising the third two of said six terminals for varying the effect of said voltage supplied by said supply voltage source means to exclusively unblock said evaluating means of the bridge-type circuit coupled to a desired one of said plurality of lines.

2. The loop supervision circuitry of claim 1 wherein, each voltage divider leg comprises:
- a first and a second serially connected resistor means;
- the first two terminals being at the first ends of said voltage divider legs; and
- means for connecting said second common bus means at each of said rows to the junction point of said pair of resistors in said fourth voltage divider legs.

4. The loop supervision circuitry of claim 3 wherein switching means are provided for shorting out one of said resistors at each of said third and fourth voltage divider legs, and pulse means for actuating a selected one of said switching means in a desired one of said columns and a selected one of said switching means in a desired one of said rows to change the auxiliary voltage at the bridge-type circuit at the desired crosspoint of said column and said row to enable the evaluating means thereat.

5. The loop supervision circuitry of claim 4 wherein said evaluating means comprises transistor means:
- said transistor means having the base coupled to the junction point of said first and second resistors of said first voltage divider leg and having the emitter coupled to the junction point of said first and second resistors of said second voltage divider leg;
- third bus means connecting the collectors of each of said evaluating means in each column;
- indicating means for indicating line conditions;
- said indicating means being coupled to the third bus means and operated responsive to a signal on the third bus means received from an actuated one of said evaluating means; and
- means for operating said switching means on a time multiplex basis for indicating the condition of the plurality of lines on a time multiplex pattern.

6. The loop supervision circuitry of claim 3 wherein the second resistor means of said first and second voltage divider legs comprise two parallel coupled resistors to enable the connection of further auxiliary voltages.